United States Patent
Susitaival et al.

(10) Patent No.: US 9,622,211 B2
(45) Date of Patent: Apr. 11, 2017

(54) ACCESS SPREADING WITH SELECTIVE PAGING

(75) Inventors: Riikka Susitaival, Helsinki (FI); Anna Larmo, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 215 days.

(21) Appl. No.: 13/640,505

(22) PCT Filed: Aug. 31, 2012

(86) PCT No.: PCT/SE2012/050930
§ 371 (c)(1),
(2), (4) Date: Oct. 11, 2012

(87) PCT Pub. No.: WO2013/115693
PCT Pub. Date: Aug. 8, 2013

(65) Prior Publication Data
US 2013/0194998 A1  Aug. 1, 2013

Related U.S. Application Data

(60) Provisional application No. 61/592,348, filed on Jan. 30, 2012.

(51) Int. Cl.
*H04J 3/16* (2006.01)
*H04W 68/02* (2009.01)

(52) U.S. Cl.
CPC .................................. *H04W 68/02* (2013.01)

(58) Field of Classification Search
USPC ................................................ 370/229–253
See application file for complete search history.

(56) References Cited

U.S. PATENT DOCUMENTS

| | | | |
|---|---|---|---|
| 8,620,336 B2 * | 12/2013 | Golaup et al. | 455/450 |
| 8,626,205 B2 * | 1/2014 | Chen et al. | 455/458 |
| 2009/0061851 A1 * | 3/2009 | Kitazoe | H04W 68/00 455/426.1 |
| 2009/0181661 A1 * | 7/2009 | Kitazoe et al. | 455/418 |
| 2009/0253422 A1 * | 10/2009 | Fischer | 455/418 |
| 2011/0141908 A1 | 6/2011 | Ishida et al. | |
| 2011/0199905 A1 * | 8/2011 | Pinheiro et al. | 370/235 |
| 2011/0269448 A1 * | 11/2011 | Chen | 455/422.1 |

(Continued)

FOREIGN PATENT DOCUMENTS

| | | |
|---|---|---|
| EP | 2205026 A1 | 7/2010 |
| EP | 2219411 A1 | 8/2010 |
| WO | 2011100540 A1 | 8/2011 |

OTHER PUBLICATIONS

Lin, U.S. Appl. No. 61/557,424.*

(Continued)

*Primary Examiner* — Kwang B Yao
*Assistant Examiner* — Juvena Loo
(74) *Attorney, Agent, or Firm* — Coats & Bennett, PLLC

(57) ABSTRACT

The present invention provides methods and apparatus for selectively notifying user equipments (UEs) of updated access barring statuses and for spreading access attempts by the UEs. The methods and apparatus disclosed in the present application reduce potential overloads in a radio access network caused by UEs simultaneously accessing the radio network, after being notified that access restrictions have been removed.

21 Claims, 10 Drawing Sheets

(56) References Cited

U.S. PATENT DOCUMENTS

| | | | |
|---|---|---|---|
| 2012/0039171 A1* | 2/2012 | Yamada et al. | 370/232 |
| 2012/0276933 A1* | 11/2012 | Laitinen | 455/458 |
| 2013/0115913 A1* | 5/2013 | Lin et al. | 455/410 |
| 2013/0122906 A1* | 5/2013 | Klatt | 455/435.1 |
| 2013/0136072 A1* | 5/2013 | Bachmann et al. | 370/329 |

OTHER PUBLICATIONS

3rd Generation Partnership Project. "3rd Generation Partnership Project; Technical Specification Group Services and System Aspects; Service accessibility (Release 11)." 3GPP TS 22.011, V11.2.0, Dec. 2011, Sophia Antipolis Valbonne, France.

3rd Generation Partnership Project. "3rd Generation Partnership Project; Technical Specification Group Radio Access Network; Evolved Universal Terrestrial Radio Access (E-UTRA); Radio Resource Control (RRC); Protocol specification (Release 10)." 3GPP TS 36.331, V10.4.0, Dec. 2011, Sophia Antipolis Valbonne, France.

3rd Generation Partnership Project. "3rd Generation Partnership Project; Technical Specification Group Services and System Aspects; Service requirements for Machine-Type Communications (MTC); Stage 1 (Release 11)." 3GPP TS 22.368, V11.3.0, Sep. 2011, Sophia Antipolis Valbonne, France.

3rd Generation Partnership Project. "3rd Generation Partnership Project; Technical Specification Group Radio Access Network; Radio Resource Control (RRC); Protocol specification (Release 11)." 3GPP TS 25.331, V11.0.0, Dec. 2011, Sophia Antipolis Valbonne, France.

* cited by examiner

ACB BITMAP 200

| 1 | 0 | 1 | 1 | 1 | 0 | 0 | 0 | 0 | 0 |
|---|---|---|---|---|---|---|---|---|---|
| 0 | 1 | 2 | 3 | 4 | 5 | 6 | 7 | 8 | 9 |

ACCESS CLASS

FIG. 2

ACCESS SPREADING WITH SELECTIVE PAGING

PRIORITY CLAIM

The present application claims priority to U.S. provisional application No. 61/592,348 filed on Jan. 30, 2012.

TECHNICAL FIELD

The present invention relates generally to access control techniques for reducing overload in an access network and, more specifically, to selectively paging a plurality of user equipments to notify the user equipments of changes in access control restrictions.

BACKGROUND

In a mobile network, a user equipment (UE) communicates with a core wireless network through a radio access network. In technical specifications provided by 3GPP, a UE is defined as a device providing user access to network services. It corresponds to a mobile station defined in GSM. Under certain circumstances, it is necessary to bar some UEs in a mobile network from accessing a radio access network, for example, to prevent overloading the network, to control congestion, to deal an emergency situation, or to handle a network failure such as Public Land Mobile Network (PLMN) failure, etc.

In an exemplary scenario in which the network discovers that there is congestion, e.g. in a random access channel, the network starts to restrict certain UEs that are configured with the access barring feature from performing a random access procedure so that the UE is effectively barred from accessing the network. The network broadcasts updated access barring information to indicate which UEs are barred from accessing the network. Since access barring information is often included in system information, the network notifies the UEs of the change in the system information by paging. Similarly, when the network congestion is alleviated, the network removes the access restrictions to allow the UEs to access the network again. The network modifies the access barring information in the system information and pages the UEs about the updated access barring information.

Different standards provide different access control mechanisms. In UTRAN standards, access control is achieved through access class barring (ACB). An access class is a random number allocated to each UE and is usually stored in the UE's SIM/USIM (Subscriber Identity Module/Universal Subscriber identity Module) card. There are ten normal access classes, ranging from 0 to 9. A special access class can range from 11 to 15. Access classes are used to identify which portion of the mobile terminals are allowed or disallowed to access the network at certain time. For example, access attempts by UEs belonging to class 0, 1, and 2 may be limited whereas UEs belong to classes 3-9 are allowed to access the network. For another example, access attempts by UEs belonging to a normal access class may be limited whereas access attempts by UEs belonging to a special access class may be allowed. In UTRAN standards, to inform the mobile terminals of the allowed/disallowed access classes, a bitmap indicating which access classes are barred and which are not may be broadcast by the network.

In E-UTRAN standards, the ACB mechanism is implemented using an access barring factor and an access barring time, both of which are broadcast in the system information (SI) when access class barring is in effect.

The updated bitmap or system information is broadcast to every UE. A paging message may be used to notify each device of the updated SI information. For example, when access restrictions have been removed, the affected UEs will be notified of the change via paging messages. In some standards, a UE may be further notified of an upcoming paging message via a paging indicator.

In the present application herein, the term "paging notification" may be used to refer to either a paging message or a paging indication or other equivalent notification signals that provide notifications to UEs of certain upcoming events.

If the UEs, upon being notified of the removal of access restrictions, attempt to access the network all at the same time, the access network may be overloaded by the number of access attempts. The overloading situation is more manifest in an access network in which a large number of Machine Type Communications (MTC) devices are deployed.

MTC devices are devices that generate delay-tolerant and/or low-priority traffic, therefore are more tolerant of access restrictions. MTC devices are often configured to support Extended Access Barring (EAB). EAB is a special access barring mechanism that allows a network operator to restrict access attempts originated from devices configured to support EAB. Network overloads caused by access attempts from MTC devices after EAB access restrictions have been removed are more common than network overloads caused by other ACB access restrictions, partly due to the large number of MTC devices deployed.

Improved methods and apparatus are needed for reducing overloads in access network caused by access attempts from UEs.

SUMMARY

The present invention provides methods and apparatus for selectively notifying UEs of updated access barring statuses and for spreading access attempts by the UEs. The methods and apparatus disclosed in the present application reduce potential overloads in a radio access network caused by UEs simultaneously accessing the radio network, after the UEs are notified that previous access restrictions have been removed for a particular access class or classes.

In an exemplary access control procedure, an access control message is broadcast to a plurality of UEs. Paging notifications are selectively sent to the plurality of UEs to notify the UEs of the broadcast access control message. When a UE receives a paging notification, it reads the broadcast access control message to retrieve the latest access control status. Selective paging prevents simultaneous access attempts from the UEs when the UEs are notified of the removal of access restrictions.

In some embodiments, paging notification may be transmitted on every paging occasion in every paging cycle. Selective paging may be achieved by assigning UEs to different paging occasions in one or more paging cycles. The number of paging cycles over which the assigned UEs are spread may be dependent on the number of UEs that are affected by the access control message. During an assigned paging occasion, a UE monitors a paging channel for paging notifications.

In some embodiments, selective paging may be achieved by transmitting paging notification in a subset of paging occasions during a paging cycle. For example, paging messages may be transmitted on every even paging occasion in one paging cycle and on every odd paging occasion in the next paging cycle. Such selective paging spreads access attempts from the affected UEs over multiple paging cycles.

In some embodiments, a timer may be implemented in a UE to ensure that, when a paging notification is missed or lost, the UE still receives updated access control message included in the broadcast access control message. Upon receiving a broadcast access control message, the UE starts the timer and waits for a paging notification. If the paging notification is received before the timer expires, the timer is stopped and the UE reads the broadcast access control message and acts accordingly, for example, initiating an access attempt to the network. If no paging notification is received when the timer expires, the UE reads the system information upon the expiration of the timer and acts accordingly.

Of course, the present invention is not limited to the features, advantages, and contexts summarized above, and those familiar with access control methods and techniques will recognize additional features and advantages upon reading the following detailed description and upon viewing the accompanying drawings.

BRIEF DESCRIPTION OF THE DRAWINGS

FIG. 2 illustrates an exemplary access control message.

DETAILED DESCRIPTION

Figure 1:
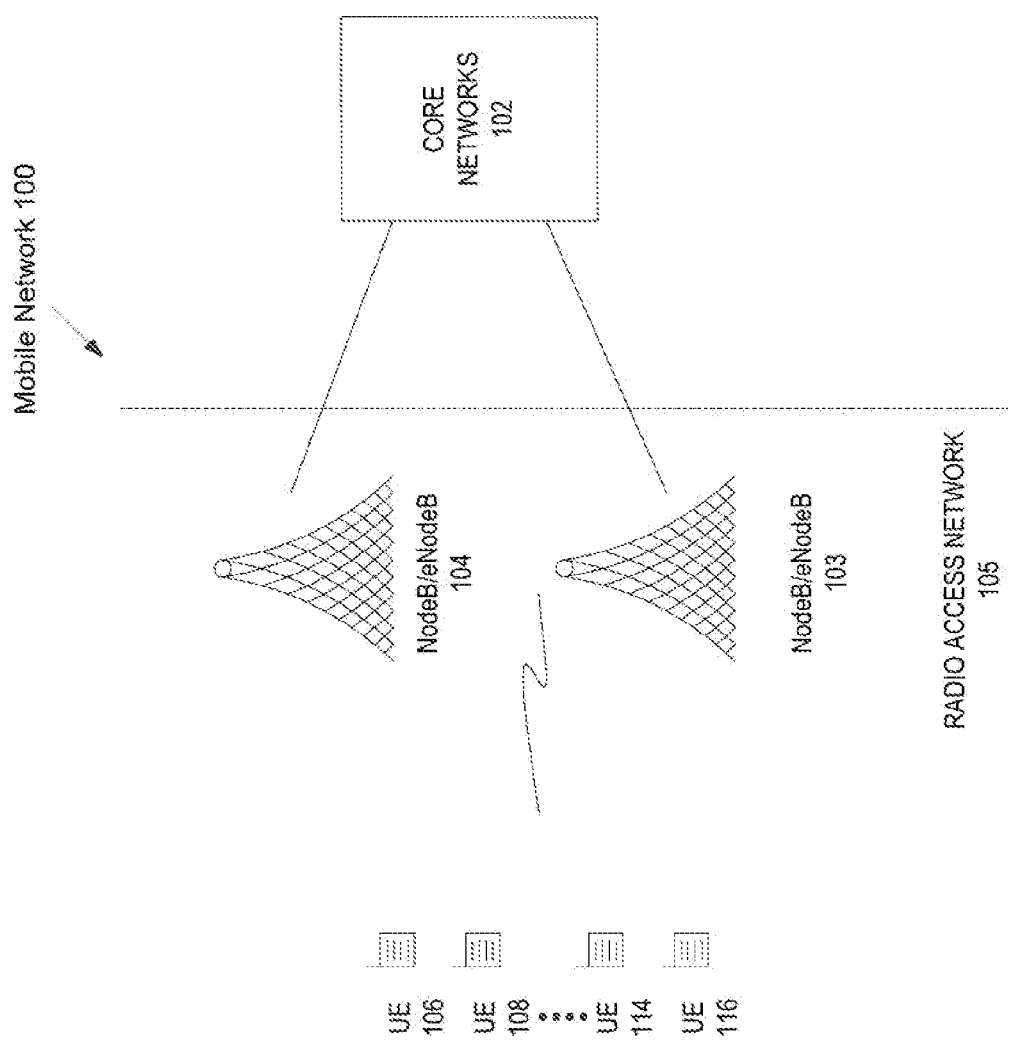
FIG. 1 illustrates an exemplary access network.

Referring now to the drawings, FIG. 1 illustrates a mobile network 100 with a UTRAN radio access network. The mobile network 100 comprises a core network 102, two NodeB's or base stations 103 and 104, and a plurality of UEs, 106, 108, . . . 114, and 116. The core network 102 may refer to a General Packet Radio Service (GPRS) core network implemented within a GSM switching subsystem. The core network 102 may include Gateway GPRS Support Nodes (GGSNs) and/or Serving GPRS Support Nodes (SGSNs) to handle IP data packets and to interface with the Internet. The NodeB 103 and 104 form a radio access network (RAN) 105 that provides a radio interface for UEs 106, 108, . . . , 116 to access the core network 102.

When there are a large number of access attempts from the UEs trying to gain access to the mobile network 100, the RAN 105 can become congested. Access control procedures are often implemented in the RAN 105 to prevent congestion.

Different communication standards provide different access control mechanisms. For example, as mentioned in the background section, the UTRAN standards implement an access control mechanism through access class barring. Each UE may be assigned an access class, e.g., a number between 0 and 9. The RAN network 105 determines which access classes are barred from accessing the network and broadcasts a bitmap to notify the plurality UEs, e.g., 106, 108 . . . , 114, and 116 of the access class barring status.

FIG. 2 illustrates an exemplary ACB bitmap 200. In the ACB bitmap 200, there are a total of 10 bits. Each bit field in the bitmap corresponds to an access class as labeled. The value in each bit field indicates whether the access class corresponding to that bit field is barred from accessing the network. For example, for access class 4, the value in the corresponding bit field is 1, which indicates that accessing the network by a UE device of access class 4 is permitted. However, for access class 7, the value in the corresponding bit field is 0. That indicates a UE device of access class 7 is barred from accessing the network.

In E-UTRAN standards, access control information such as access barring factor and access barring time may be included in the system information broadcast to the UEs in the network. System information is also used to carry access control information related to Extended Access Barring (EAB).

In E-UTRAN standards, a UE receives broadcast system information that includes an access barring factor and an access barring time. To decide whether it is allowed to access the network, the UE first draws a random number and compares the random number with the broadcast access barring factor. For example, when the value of the random number drawn by the UE is lower than the access barring factor, the UE decides that its access attempt is barred this time. Otherwise the UE proceeds to initiate an access attempt. If barred, the UE determines an access barring period based on the access barring time broadcast in the system information. Methods for calculating the access barring period can be found in 3GPP TS 36.331.

Figure 3:
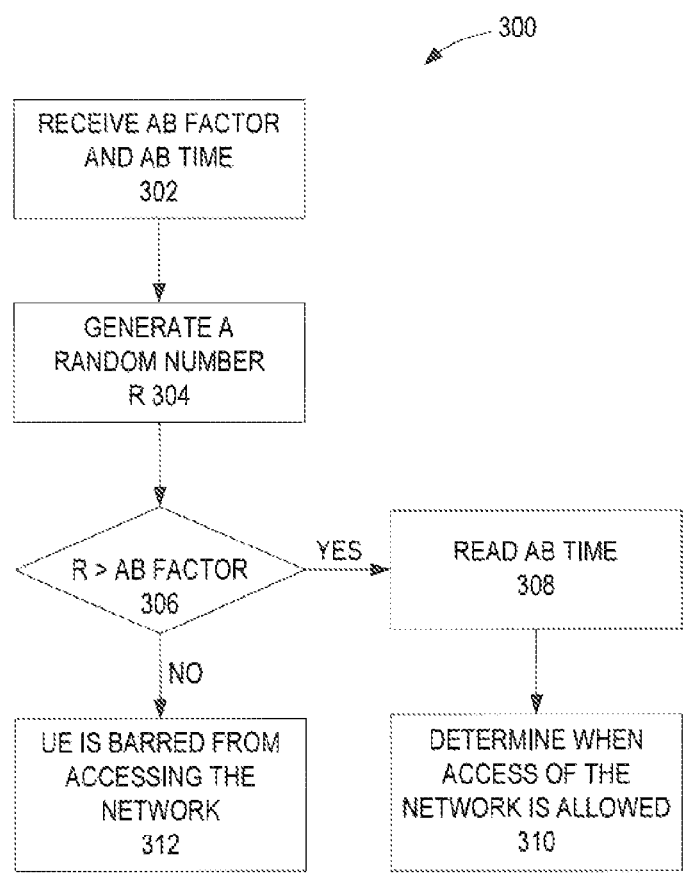
FIG. 3 illustrates a flowchart of an exemplary access control process.

FIG. 3 is a flowchart 300 illustrating an exemplary access control process implemented at a UE in accordance with E-UTRAN standards. The UE receives an access control message that includes an access barring factor and an access barring time (step 302). The UE generates a random number R (step 304) and then compares the random number R with the received access barring (AB) factor (step 306). If the random number R is less than or equal to the AB factor, the UEs determines that it is barred from accessing the network (step 312). If the random number R is larger than the AB factor, the UE reads the AB time (step 308) and determines when access of the network is allowed (step 310).

The ACB bitmap 200 depicted in FIG. 2 and the broadcast system information referred to in FIG. 3 may be generally referred to as access control messages in the present application.

In some implementations, UEs do not monitor broadcast system information or access control message. Instead, UEs rely on a paging notification to notify them of the availability of access control messages. In other implementations, a UE receives an access control message but does not immediately retrieve the information included in the access control message. The UE waits for a paging notification before reading the access control message.

A paging notification may be addressed to a specific UE or may be intended for every UE in the system. In the present application, a paging notification may refer to a paging message, or a paging indication that is used to notify a UE of an upcoming paging message, or other equivalent notifications used to notify a UE or UEs of certain events.

In LTE standards, three different types of paging indications are currently defined: 1) the normal system information (SI) modification indication, 2) the Earthquake and Tsunami Warning System (ETWS) notification indication, and 3) the Commercial Mobile Alert Service (CMAS) notification indication.

Upon receiving a normal SI modification indication informing a UE that the system information has been modified, the UE reads the related system information at the next modification boundary. With ETWS and CMAS notification indications, the UE reads the ETWS/CMAS system information immediately after receiving the ETWS/CMAS notification indication.

With respect to access barring information, a UE may be implemented to read the access barring information at the next modification boundary upon receiving a paging notification, similar to the implementation for normal SI modification indications. A UE may also be implemented to read the updated access barring information immediately after a paging notification, similar to the implementation for ETWS/CMAS messages.

To receive paging indications, all UEs are configured to listen to a paging channel or a paging indication channel at predefined paging occasions during their assigned paging cycles.

Figure 4:
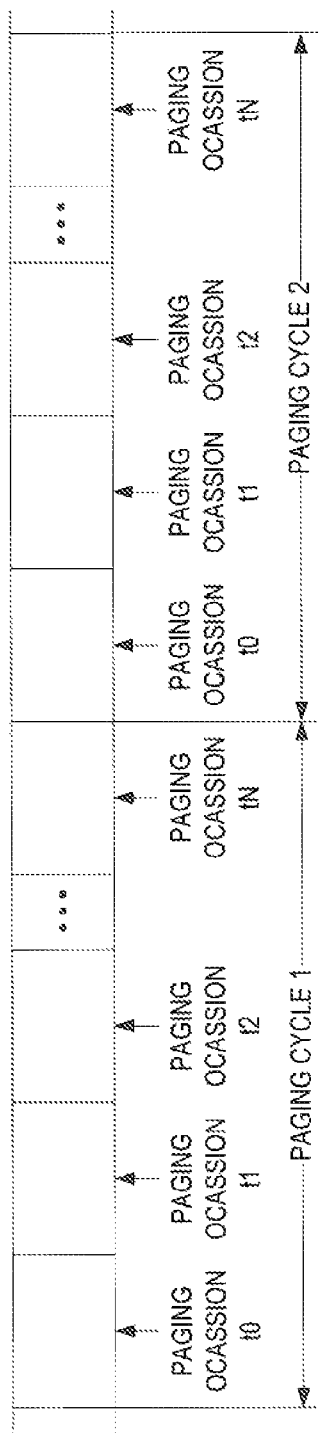
FIG. 4 illustrates an exemplary process of selectively sending paging messages to different groups of UEs.

FIG. 4 depicts a typical paging channel divided into multiple paging frames or cycles. A paging cycle includes multiple paging occasions, $t_0, t_1, \ldots, t_N$. Each paging occasion corresponds to the transmission of a paging indicator. A UE is often assigned one paging occasion within a paging cycle to monitor paging indicators. Typically there are several UEs listening to the same paging occasion. To inform the UEs of a broadcast access control message, the network may send paging indicators on all paging occasions during a paging cycle.

Figure 5:
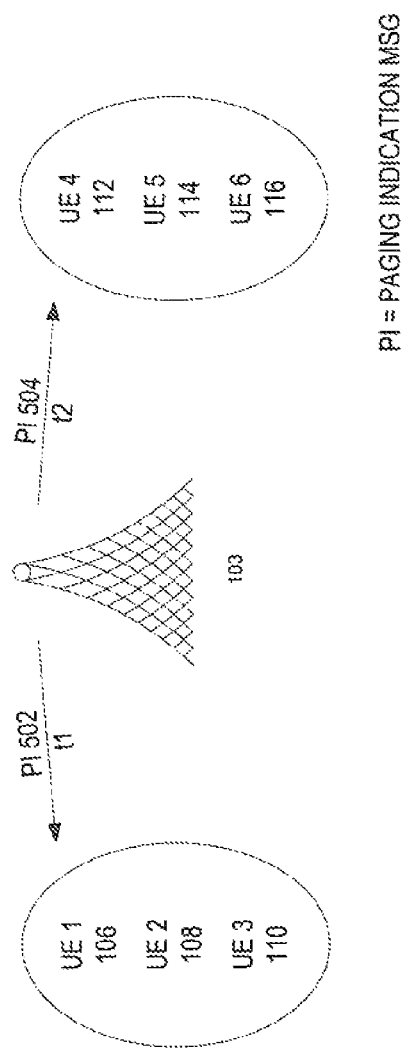
FIG. 5 illustrates an exemplary paging procedure.

In one embodiment, the paging occasions assigned to the UEs are spread over one paging cycle. Therefore, the access attempts by the UEs will be spread over one paging cycle. For example, in FIG. 5, UEs 106, 108, and 110 receive a paging notification 502 at paging occasion $t_1$ in paging cycle 1 (see FIG. 4). After receiving the paging notification message, UEs 106, 108 and 110 read the updated system information. Upon discovering that the access restrictions have been removed, the three UEs initiate access attempts to the network. At a later time, a second paging notification 504 is received by a different group of UEs that belong to the paging occasion t2 in paging cycle 1 (see FIG. 4). After being notified, this group of UEs (UE 112, 114, and 116) read the update system information and initiate network access attempts if the update system information indicates that access barring is no longer in effect.

The current maximum length for a paging cycle is 2.56 seconds. In some scenarios, if all UEs are assigned to one paging cycle, the length of the paging cycle may be insufficient, as the UEs assigned to the same paging cycle may be simultaneously accessing the network within 2.56 seconds. To prevent potential overloading of the access network, the paging occasions assigned to the UEs may be spread over multiple paging cycles. For example, the network can transmit a paging notification message in every even paging occasion during one paging cycle. Only the UEs assigned to the even paging occasions will receive a paging notification in this paging cycle. During the next paging cycle, the network transmits a paging message in the odd paging occasions, therefore only the UEs assigned to the odd paging occasions will receive a paging notification this time.

Figure 6:
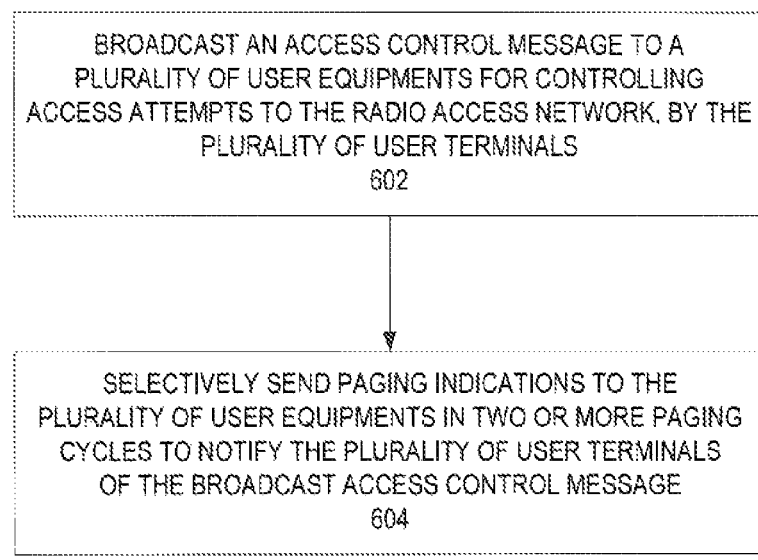
FIG. 6 is a flowchart illustrating the process of selectively sending paging notifications to a plurality of UEs.

FIG. 6 describes a general access control procedure implemented at the NodeB 104 using a spread paging method. In FIG. 6, the NodeB 104 broadcasts an access control message to a plurality of user terminals for controlling access attempts to the radio access network by the plurality of user terminals (step 602). In some embodiments, the access control message may be a broadcast system information update. The NodeB then selectively sends paging indications to the plurality of user terminals in two or more paging cycles to notify the plurality of user terminals of the broadcast access control message (step 604). For example, the NodeB can send the paging notification in even paging occasions during one paging cycle and in odd paging occasions during the next paging cycle. In such case, approximately one-half of the UEs in the affected access classes will receive the notification in each paging cycle.

Figure 7:
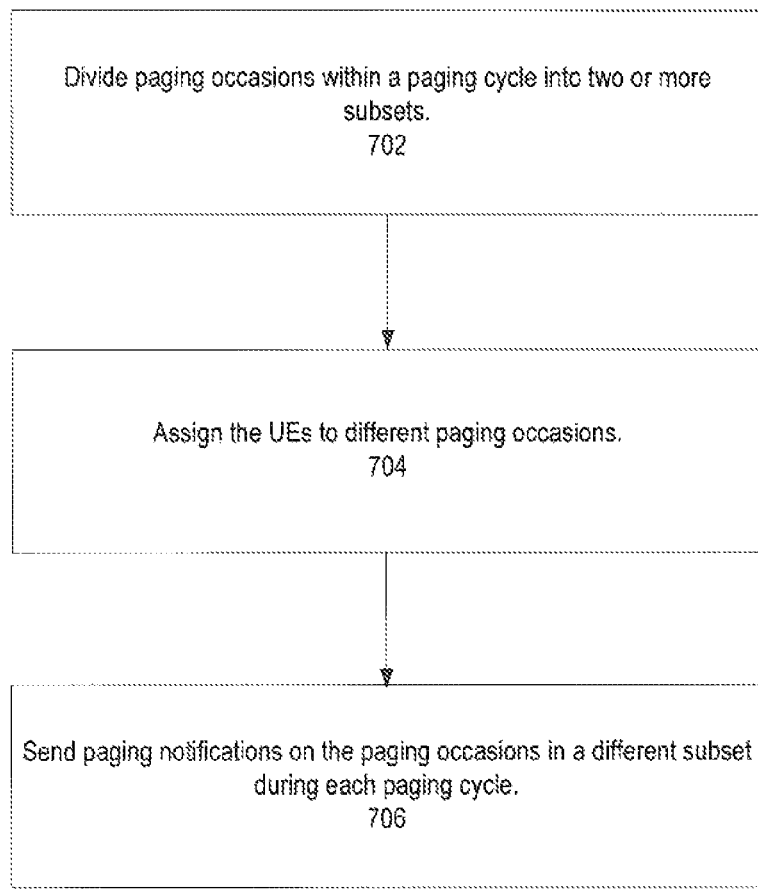
FIG. 7 illustrates an exemplary embodiment of selectively paging a plurality of UEs.

FIG. 7 illustrates an exemplary embodiment of selectively paging a plurality of UEs. In FIG. 7, the paging occasions within a paging cycle are divided into two or more subsets (step 702). The plurality of UEs are assigned to different paging occasions (step 704). Selective paging is done by sending paging notifications on the paging occasions belonging to a different subset during each paging cycle (step 706). For example, in a first paging cycle, the paging notifications are sent on the paging occasions of a first subset. In a second paging cycle, the paging notifications are sent on the paging occasions of a second subset. During the first paging cycle, only the UEs assigned to the paging occasions of the first subset receive paging notifications. In the second paging cycle, only the UEs assigned to the second subset of paging occasions receive paging notifications.

Figure 8:
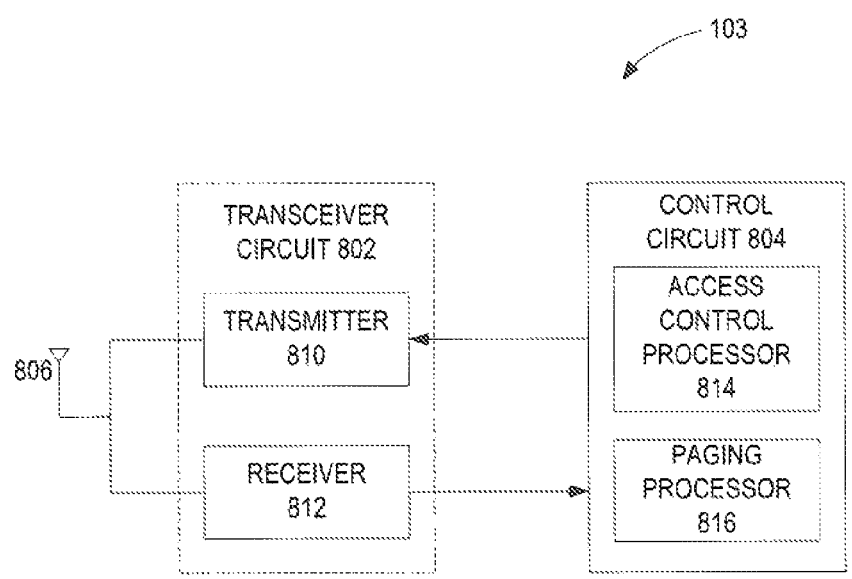
FIG. 8 illustrates an exemplary apparatus configured to perform an access control process.

The structure of a NodeB configured to perform the process described in FIGS. 6 and 7 is illustrated in FIG. 8. The NodeB 103 comprises a transceiver circuit 802 configured to communicate with an antenna 806 and a control circuit 804 configured for access control. The transceiver circuit 802 includes a transmitter 810 and a receiver 812 for transmitting and receiving signals. The control circuit 804 further comprises an access control processor 814 and a paging processor 816. The access control processor 814 is configured to broadcast access control messages to the UEs for controlling access attempts by the UEs. The paging processor 816 is configured to selectively send paging indicators to the UEs to notify the UEs of broadcast access control messages. The control circuit 804 may be implemented by one or more processors, hardware, firmware, or a combination thereof.

In some embodiments, the UEs may be configured to read updated access barring information only after receiving a paging notification. To avoid the situation where the paging notification is missed or lost and the affected UEs are not able to update system information for a long period of time, a timer can be implemented and configured to expire after a predetermined period of time. For example, the predetermined period of time may be a typical time period between two system information updates.

Figure 9:
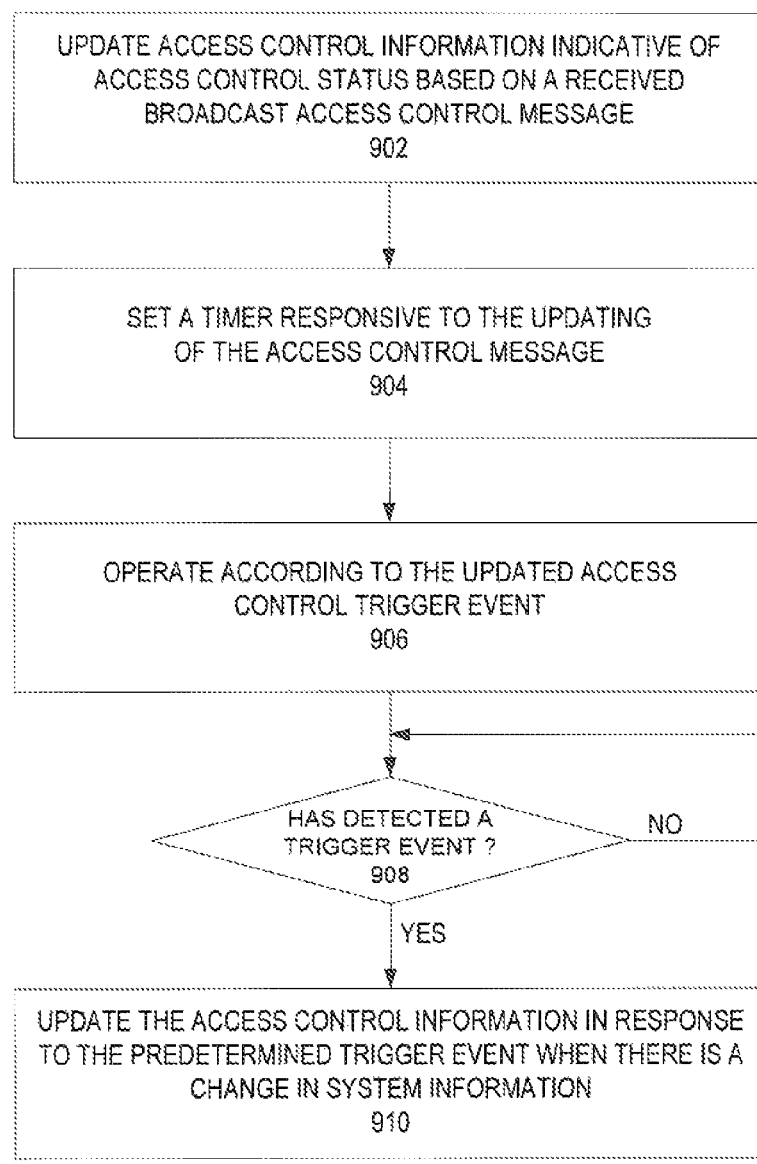
FIG. 9 is a flowchart illustrating an exemplary process implemented at a UE for updating access control information using a timer.

FIG. 9 is a flowchart illustrating a process implemented at a UE for updating access control information using a timer. A UE first receives a broadcast access control message and updates access control information indicative of access control status based on the received message (step 902). The UE then sets a timer in response to the updating of the access control information (904) and operates according to the updated access control information (906). For example, the UE may initiate an access attempt if the access restriction is removed.

In step 908, the UE checks if a trigger event has been detected. A trigger event is the first of either a reception of a paging indication or an expiration of the timer to occur. If a trigger event has not been detected, the UE awaits for a next trigger event. If a trigger event is detected, the UE updates the access control information in response to the predetermined trigger event when there is a change in system information (step 910).

Figure 10:
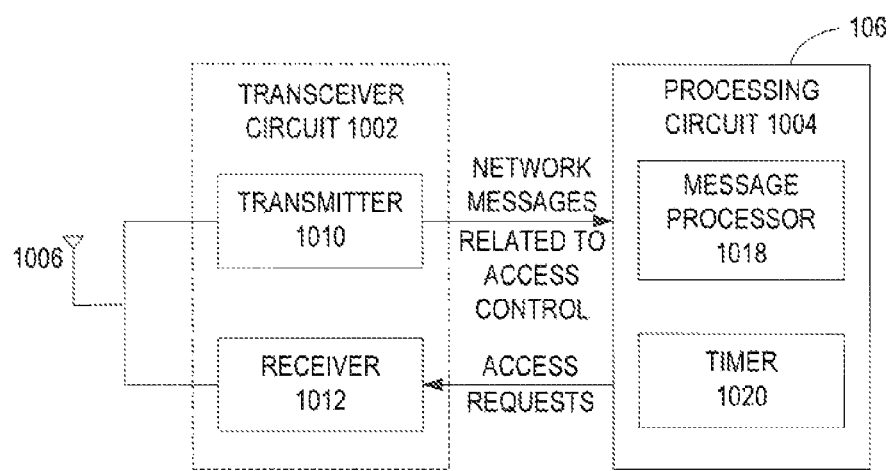
FIG. 10 illustrates an exemplary UE configured to received access control messages from the network and update access control information in accordance with the methods described herein.

FIG. 10 illustrates an exemplary UE 106 configured to perform the process described in FIG. 9. The UE 106 comprises a transceiver circuit 1002 connected to an antenna 1006 and a processing circuit 1004 comprises a message processor 1018 and a timer 1020. The transceiver circuit 1002 further comprises a transmitter 1010 for transmitting signals and a receiver for receiving signals. The transceiver circuit 1002 is configured to send network messages related to access control to the processing circuit 1004 and to receive access requests from the processing circuit 1004. The processing circuit 1004 comprises a message processor 1010 configured to process the received network messages related to access control. The message processor 1010 is also configured to prepare access requests to be sent by the transceiver circuit 1002 for accessing the network. The processing circuit 1004 further comprises a timer 1020, which can be set by the processing circuit for scheduling the next update of access control information, in case the paging notification is lost.

The foregoing description uses UTRAN or ETRAN access control procedures as examples to illustrate the advantageous techniques disclosed herein. The present invention can be applied to other access control procedures by a person ordinarily skilled in the art, for example, service specific access control procedures.

Service specific access control is an access control procedure designed to restrict access attempts initiated by a particular service. For example, 3GPP TS 22.011 standard describes an access control mechanism referred to as Service Specific Access Control (SSAC) for certain multimedia telephony (MMTEL) functions. To initiate a MMTEL service, a UE sends a session request while in an idle-mode. SSAC uses an Evolved Packet System (EPS) to provide access control to MMTEL services. SSAC assigns a service probability factor and mean duration for each of MMTEL voice services and MMTEL video services.

For another example, Circuit Switched Fall Back (CSFB) standards also define an access control mechanism. The present invention is applicable to both SSAC and CSFB access control mechanisms, as well as other similar or equivalent access control mechanisms.

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method to control access attempts by a plurality of User Equipment (UE) in a radio access network, comprising:
   dividing paging occasions within a paging cycle into a first set of paging occasions and a second set of paging occasions;
   assigning the first set of paging occasions to a first set of the plurality of UEs and the second set of paging occasions to a second set of the plurality of UEs;
   broadcasting an access control message to the plurality of UEs for controlling access attempts to the radio access network by the plurality of UEs;
   sending a first paging notification in the first set of paging occasions of a first paging cycle to notify the first set of the plurality of UEs of the access control message; and
   sending a second paging notification in the second set of paging occasions of a second paging cycle to notify the second set of the plurality of UEs of the access control message, wherein the first and second sets of the plurality of UEs are each associated with but assigned to different paging cycles with the first paging cycle adjacent in time to the second paging cycle.

2. The method of claim 1, wherein the access control message restricts access attempts from one or more of the plurality of UEs.

3. The method of claim 1, wherein the access control message removes access attempt restrictions for one or more UEs.

4. The method of claim 1, wherein the first set of paging occasions includes odd paging occasions and the second set of paging occasions includes even paging occasions.

5. The method of claim 1, wherein the first paging notification and the second paging notification are adjacent to each other in time and have different sets of the plurality of UEs targeted by the corresponding paging notification.

6. The method of claim 1, wherein each of the different and adjacent paging cycles has a paging occasion for each of the first and second sets of the plurality of UEs.

7. A network node that provides and controls access to a radio access network by a plurality of User Equipment (UE), the network node comprising:
   a control circuit configured to control access to the radio access network by UEs, the control circuit comprising:
      an access control processor configured to:
         generate an access control message controlling access attempts to the radio access network by the plurality of UEs; and
      a paging processor configured to:
         divide paging occasions within a paging cycle into a first set of paging occasions and a second set of paging occasions;
         assign the first set of paging occasions to a first set of the plurality of UEs and the second set of paging occasions to a second set of the plurality of UEs;
         generate a first paging notification in the first set of paging occasions of a first paging cycle to notify the first set of the plurality of UEs of the access control message; and
         generate a second paging notification in the second set of paging occasions of a second paging cycle to notify the second set of the plurality of UEs of the access control message, wherein the first and second sets of the plurality of UEs are each associated with but assigned to different paging cycles with the first paging cycle adjacent in time to the second paging cycle; and
   a transceiver configured to:
      transmit the access control message and the first and second paging notifications in the respective first and second paging cycles to the corresponding first and second sets of the plurality of UEs.

8. The network node of claim 7, wherein the access control message restricts access attempts from one or more of the plurality of UEs.

9. The network node of claim 7, wherein the access control message removes access attempt restrictions for one or more of the plurality of UEs.

10. The network node of claim 7, wherein the first set of the paging occasions includes odd paging occasions and the second set of the paging occasions includes even paging occasions.

11. The network node of claim 7, wherein the first paging notification and the second paging notification are adjacent to each other in time and have different sets of the plurality of UEs targeted by the corresponding paging notification.

12. A method implemented in a User Equipment (UE) for accessing a radio access network, the method comprising:
in response to updating access control information, setting a timer that is configured to expire after a pre-determined period of time;
operating according to the access control information until a predetermined trigger event occurs, wherein the predetermined trigger event includes expiration of the timer before receiving a paging notification; and
updating, in response to the predetermined trigger event, the access control information when there is a change in system information.

13. The method of claim 12, further comprising:
determining that the change in system information has occurred based on the paging notification.

14. The method of claim 13, wherein the updating of the access control information takes place immediately after the predetermined trigger event.

15. The method of claim 13, wherein the updating of the access control information takes place during an assigned paging occasion of the UE after the predetermined trigger event.

16. The method of claim 12, wherein the predetermined period of time is associated with a period of time between two updates of the system information.

17. A User Equipment (UE) configured to access a radio access network, the UE comprising:
a transceiver configured to:
receive an access control message, the access control message including information that controls access by the UE to the radio access network; and
a processing circuit configured to process the broadcast access control message, the processing circuit configured to:
update access control information indicative of access control status based on a received broadcast access control message;
in response to updating the access control information, set a timer that is configured to expire after a pre-determined period of time;
operate according to the access control information until a predetermined trigger event, wherein the predetermined trigger event includes expiration of the timer before receiving a paging notification; and
update, in response to the predetermined trigger event, the access control information when there is a change in system information.

18. The UE of claim 17, wherein the processing circuit is further configured to determine that the change in system information has occurred based on the paging notification.

19. The UE of claim 18, wherein the processing circuit is configured update the access control information immediately after the predetermined trigger event.

20. The UE of claim 18, wherein the processing circuit is configured to update the access control information during an assigned paging occasion of the UE after the predetermined trigger event.

21. The UE of claim 17, wherein the predetermined period of time is associated with a period of time between two updates of the system information.

* * * * *